May 3, 1932.  M. ZASS  1,856,738
TROLLEY EAR
Filed Jan. 30, 1930
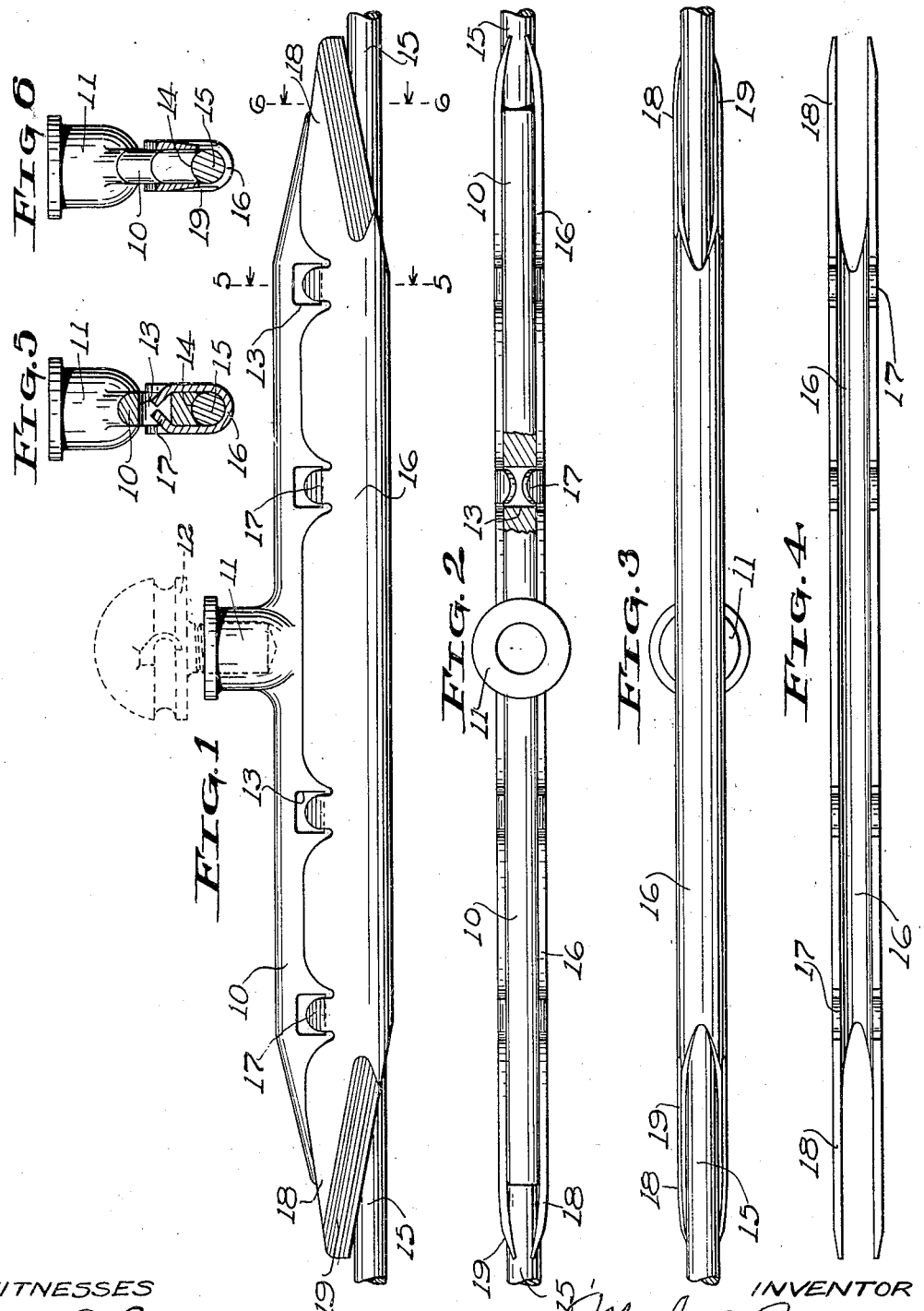
WITNESSES  INVENTOR Patented May 3, 1932

1,856,738

UNITED STATES PATENT OFFICE

MICHAEL ZASS, OF WAUWATOSA, WISCONSIN, ASSIGNOR TO THE MILWAUKEE ELECTRIC RAILWAY & LIGHT COMPANY, OF MILWAUKEE, WISCONSIN, A CORPORATION OF WISCONSIN

TROLLEY EAR

Application filed January 30, 1930. Serial No. 424,607.

The invention relates to trolley ears, and more particularly to that type of trolley ear embodying a renewable wear member.

The trolley ear which is in general use at the present time consists of an elongated body of soft ductile cast metal provided at its upper portions with means for attachment to a suitable hanger, and at its lower edges with lips or flanges which are adapted to be hammered or peened about the trolley wire to support the wire and to form a wearing surface on which the trolley wheel or trolley shoe may ride. This type of trolley ear is not only inconvenient to install but requires frequent replacement because of wear, and the construction of the ear is such as to cause objectionable arcing and pounding during the passage of the trolley wheel or trolley shoe over the ear, and especially at the opposite ends of the ear.

Various attempts have been made to devise a trolley ear with a body member and a separate renewable wear member engaging the underside of the trolley wire, the wear member being replaceable without removing the body member from its hanger or other support. However, trolley ears of this type previously devised are open to objection for various reasons, among which are complicated and expensive construction, difficulty of attachment under cold and adverse weather conditions, and interference with the passage of the trolley wheel or trolley shoe. Also, such previously suggested devices have not been of a construction adapted to minimize pounding and arcing during the passage of the trolley wheel or trolley shoe.

It is an object of the present invention to provide a trolley ear of simple but durable construction capable of being easily handled by gloved workmen in tower vehicles, even in cold or inclement weather, there being no small parts which would be awkward to manipulate and which would be subject to loss.

Another object of the invention is to provide a trolley ear including a renewable wear member which can be firmly anchored in place on either a new or worn trolley wire and which can be quickly removed and replaced, to thereby avoid unnecessary hampering of traffic by tower vehicles.

A further object of the invention is to provide a trolley ear of the renewable wear member type which can be manufactured at relatively low cost, since very little machine work is required.

A further object is to provide a trolley ear which will withstand severe side wear and which will avoid interference with the passage thereover of either new or worn trolley wheels or shoes.

A further object is to provide a trolley ear which is constructed in such manner as to insure a smooth approach and departure of the trolley wheel or trolley shoe, whether such wheel or shoe is new or worn, thereby minimizing wear, pounding and arcing.

The invention further consists in the several features hereinafter set forth and more particularly defined by the annexed claims.

In the accompanying drawings, Fig. 1 is a side elevation of a trolley ear embodying the invention, as it appears with the trolley wire in place;

Fig. 2 is a top view of the trolley ear, parts being broken away and parts being shown in section;

Fig. 3 is a bottom view thereof;

Fig. 4 is a detail view of the renewable wear member;

Fig. 5 is a detail transverse sectional view of the trolley ear taken on the line 5—5 of Fig. 1, and Fig. 6 is a similar view taken on the line 6—6 of Fig. 1.

In these drawings, the numeral 10 designates an elongated body member which is provided with an upwardly-extending internally-threaded boss 11 adapted to be screwed on a hanger 12 carried on the cross span wire or other support. The body member 10 is provided with a plurality of transversely-extending openings 13 for a purpose hereinafter described, and the lower edge of the body member has a longitudinal groove 14 which forms a concave seat engageable with the upper portions of a trolley wire 15. The body member is preferably a casting and may be made of light metal, such as aluminum or an aluminum alloy, to reduce the weight of the overhead structure. No machining operations are required on the body member with the exception of the threading of the boss 11.

For holding the trolley wire 15 in place on the body member 10, a renewable channel-shaped wear member 16 receives the trolley wire therein and embraces the opposite sides of the body member 10, to which the wear member is secured by ears or lugs 17 clinched into the openings 13 in the body member. The wear member 16 is made of some suitable long-wearing material, such as hard drawn, rolled, or extruded copper, brass, phosphor bronze, manganese bronze, or alloys of copper, aluminum, iron, or other metals. The wear member may be punched out of heavy flat metal stock, the blank being then formed to channel-shape by means of suitable dies. The opposite ends of the wear member are forked to form long tapered blades 18 which engage the opposite sides of the trolley wire, the inner portions of the blades being laterally engageable with the end portions of the body member. The lower edges of the blades are inclined and the upper and outer ends of the blades, which are above the trolley wire, are bent inwardly a short distance, as seen in Fig. 2. The opposite outer sides of the blades 18 are provided with inclined faces 19 terminating in spaced relation to the inner end of the blades, the lower edges of the blades being reduced in thickness to provide a wedge-shaped cross-section. These inclined faces 19 may be inexpensively produced by a grinding operation. The inclination of the lower edge of each blade with respect to the axis of the trolley wire is relatively small, being on the order of 10° or 12° of arc. By reason of the construction of the end portions of the wear member, a smooth approach and departure is provided for either a new or worn trolley wheel or trolley shoe to avoid pounding and arcing at the ends of the shoe, thereby extending the life of the parts and avoiding transmission of noise through the trolley pole to the roof of the car. In approaching the trolley ear, the grooved trolley wheel or trolley shoe engages the opposite inclined faces 19 of the blades 18 and is gradually and smoothly depressed until the wheel or shoe rides on the smooth bottom surface of the channel-shaped wear member 16. As the trolley wheel or trolley shoe leaves the trolley ear, it gradually and smoothly rises in its passage along the inclined blades to again engage the trolley wire.

To install the trolley ear, the body member 10 is screwed onto the hanger 12 on the cross span wire or other support. The trolley wire is then placed in the groove in the lower edge of the body member, and the channel-shaped wear member 16 is then saddled onto the trolley wire and body member in such position that the ears or lugs 17 are in register with the openings 13 in the body member. While the wear member 16 is thus held tightly in position, the lugs 17 are bent into the openings 13, thereby securely holding the wear member in firm contact with the trolley wire and body member. Each pair of opposite lugs 17 are simultaneously clinched into the registering opening by a suitable tool, the clinching operation serving to draw the wear member upwardly into firm contact with the trolley wire. The end portions of the blades 18 are then bent inwardly to the position seen in Fig. 2, thus completing the approach and departure for the trolley ear as well as affording further means of securing the wearing member to the trolley wire. All of these operations can be done very quickly by the linemen even under cold or adverse weather conditions and when wearing heavy gloves.

When the wear member becomes worn after a long period of service, it can be quickly removed by straightening out the bends at its ends and then by means of a punch or other suitable tool straightening out the clinched ears or lugs 17 by driving through the openings in the body member from opposite sides. Another method of removal consists in cutting off the clinched lugs with a chisel or other tool and then prying the wear member away from the body member and trolley wire. A new wear member can then be quickly and firmly installed in place, in the manner above described, without removing the body member 10. The facility with which the wear member of the trolley ear can be replaced is of considerable importance in busy districts, where there are frequent car passes, and where the tower truck must frequently move out of the track to permit a car to pass.

What I claim as new and desire to secure by Letters Patent is:

1. A trolley ear comprising a body member adapted to be suspended from a support and having a lower edge adapted to receive a trolley wire thereagainst, there being openings in the side walls of said body member, and a metal channel member embracing said body member and said trolley wire and having bendable clinching ears entering the side openings of said body member for firmly retaining said trolley wire on the ear.

2. A trolley ear comprising a body member adapted to be suspended from a support and having a lower edge adapted to receive a trolley wire thereagainst, and a metal channel member embracing said trolley wire and said body member and secured to said body member for retaining said trolley wire in position, said channel member including blade portions at its ends engaging opposite sides of said trolley wire and having inclined lower edge portions affording a smooth approach and departure for a trolley wheel or shoe passing over said ear, the end portions of said body member being interposed between said blade portions in lateral abutment therewith.

3. A trolley ear comprising a body member adapted to be suspended from a support and having a lower edge adapted to receive a trolley wire thereagainst, there being openings extending transversely between the opposite side walls of said body member, and a metal channel member embracing said body member and said trolley wire and having a plurality of pairs of oppositely disposed bendable clinching ears entering said openings and engaging the lower sides thereof for firmly retaining said trolley wire on said ear.

4. In a trolley wire supporting device, the combination of a supporting ear having a support attaching means and a wire seat extending lengthwise of its lower edge, said ear having lug-receiving slots along the sides of its lower edge; and a runner having a wire-receiving groove extending lengthwise of its upper edge, and securing lugs extending upwardly from the edges of the groove, said lugs registering with said slots and being clinched on the ear.

5. In a trolley wire supporting device, the combination of an ear having a supporting socket, longitudinally extending webs with a flanged edge along its bottom having a trolley wire seat and lug-receiving slots at a side of its edge; and a runner having a trolley receiving groove and lugs extending into said slots, said runner being secured to the ear by the clinching of said lugs.

In testimony whereof, I affix my signature.

MICHAEL ZASS.